United States Patent [19]

Ives

[11] 4,363,172
[45] Dec. 14, 1982

[54] APPARATUS FOR MEASURING ECCENTRICITY OF ROLLS

[75] Inventor: Kenneth D. Ives, Murrysville, Pa.

[73] Assignee: United States Steel Corporation, Pittsburgh, Pa.

[21] Appl. No.: 255,130

[22] Filed: Apr. 17, 1981

[51] Int. Cl.³ .............................................. G01B 5/14
[52] U.S. Cl. .................................. 33/174 Q; 33/182; 33/143 L; 33/147 K
[58] Field of Search ................. 33/143 L, 182, 147 N, 33/178 F, 147 K, 174 L, 174 Q, 147 L; 164/150

[56] References Cited

U.S. PATENT DOCUMENTS

Re. 30,075  8/1979  Gonos et al. ...................... 33/143 L
3,962,794   6/1976  Kima et al. ............................ 33/182
4,148,145   4/1979  Holter et al. ...................... 33/143 L

FOREIGN PATENT DOCUMENTS 2253794  3/1974  Fed. Rep. of Germany .
2645022  4/1978  Fed. Rep. of Germany .

Primary Examiner—Harry N. Haroian
Attorney, Agent, or Firm—William F. Riesmeyer, III

[57] ABSTRACT

An apparatus is provided for measuring roll eccentricity. It includes a housing adapted for guided transport in a reference direction tangent to the roll face. The housing is also adapted to rotate the roll at the speed of transport. An elongated runner extending lengthwise in the transport direction is displaceably mounted in the housing. The roll face abuts and displaces the runner but the runner mounting maintains it parallel to the transport direction. Thus, measurements of runner displacement at any point along its length provide an indication of eccentricity of the roll.

10 Claims, 4 Drawing Figures

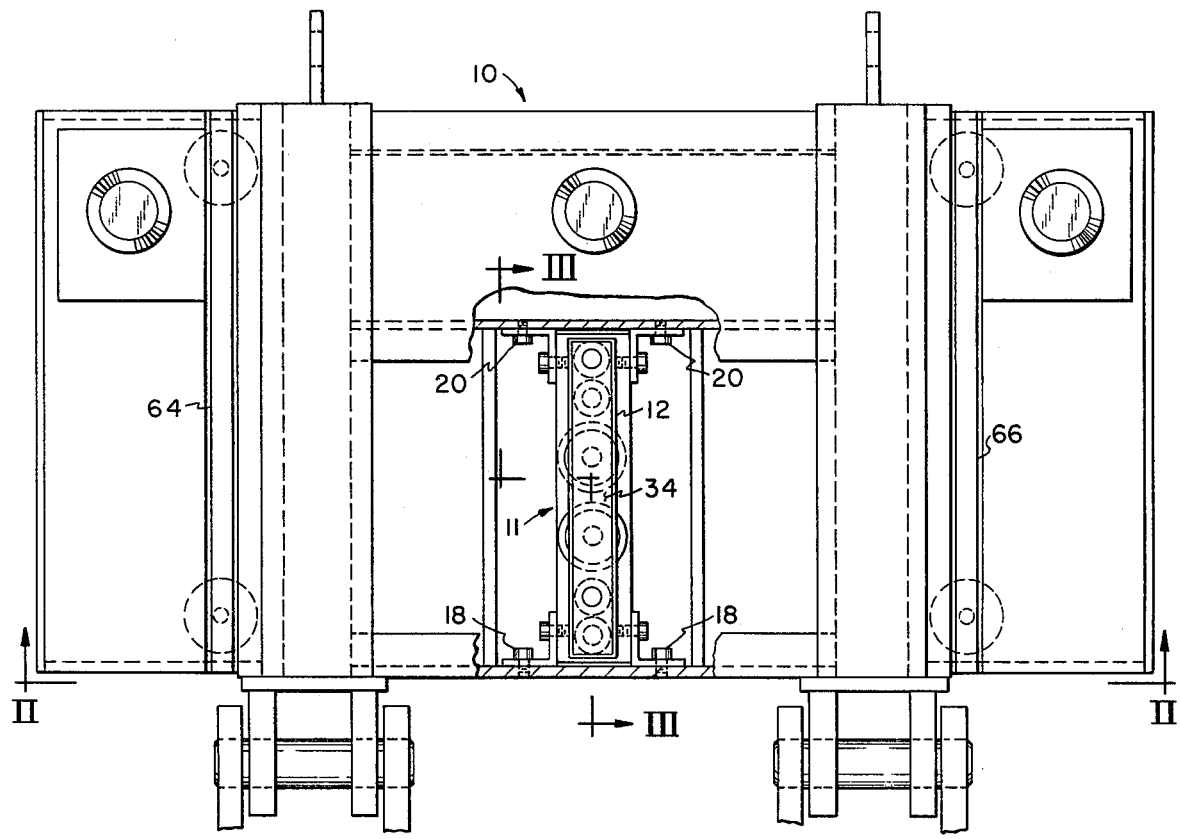
FIG_1
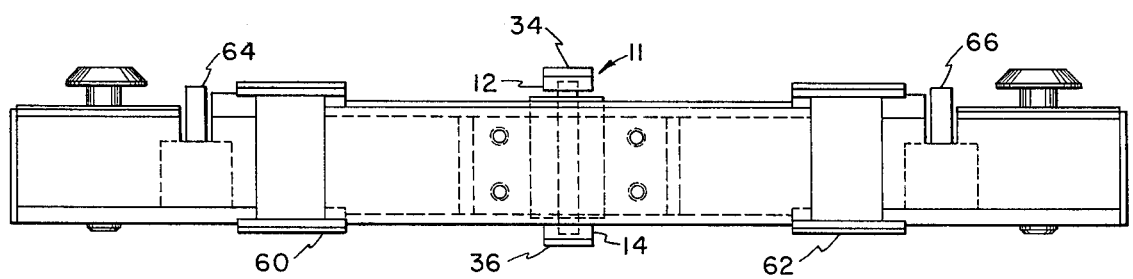
FIG_2

APPARATUS FOR MEASURING ECCENTRICITY OF ROLLS

BACKGROUND OF THE INVENTION

This invention relates to apparatus for measuring the eccentricity of rolls, particularly rolls in the secondary cooling zone of a continuous casting machine.

In continuous casting, proper confinement of the metal emerging from the mold is necessary for obtaining the best physical and metallurgical characteristics. Rolls spaced precise distances on opposite faces of the partially solidified bar provide the support required. Various devices have been used to measure the separation distance between the rolls, both initially after a rebuild of the machine, and periodically thereafter.

In service the rolls are exposed to high temperatures and may bend, thus becoming eccentric and adversely affecting confinement of the metal and thus the quality of the product. An apparatus for measuring eccentricity of rolls in the cooling zone of casters is shown in U.S. Pat. No. 4,148,145 Hölter et al. The main disadvantage of that device is that it must remain stationary while the rolls adjacent to it are rotated, thus obtaining a measure of the bending present. This is a very time-consuming operation. A roll gap sled shown in U.S. Pat. No. Re. 30,075 of common ownership with the application herein can be used to make multiple passes through the cooling zone (because it is guided on a constant reference path) and thus obtain some indication of eccentricity assuming point contact measurements are made at different locations on the roll peripheries. In addition to being time consuming, this does not provide an accurate nor a complete indication of eccentricity.

It is therefore a primary object of this invention to provide an apparatus for measuring roll eccentricity in a single transport pass tangent to the roll face in a direction normal to the roll axis.

SUMMARY OF THE INVENTION

The apparatus of this invention includes a housing adapted for transport substantially tangent to the roll face in a direction normal to the roll axis. Means are provided in the housing for (a) guiding it during transport (b) rotating the roll at the speed of transport of the housing. The housing is maintained in a path so that an axis of it is coincident with the transport direction and that direction is maintained constant for a sufficient period that a measure of eccentricity can be obtained. Thus, a position in the guided housing may be used as a reference distance from the roll face. An elongated measuring runner projects laterally from the housing so as to be abutted by the roll. The runner extends lengthwise parallel to the direction of housing transport so that as the roll rotates and the housing is transported, the roll traverses the runner end to end. A mounting is provided so that the runner is displaceable in the housing when contacted by the roll, but is maintained parallel to the transport direction. Thus, means for measuring the displacement distance of the runner at a point thereon from a reference position in the housing provides an accurate measure of roll eccentricity. The measuring runner must be long enough to provide measurements along a sufficient portion of the roll periphery to indicate its eccentricity. Preferably the runner length is equal to at least one-half of the circumference of the face of the roll.

The apparatus is particularly suited for use in continuous casting machines. The housing for such devices may be adapted for connection to the starter bar and will include a second measuring runner on the side opposite the first for abutting other of spaced rolls arranged in pairs in the cooling zone. The runners are preferably located in a central location so as to measure the middle of the roll faces since bending is most pronounced there.

BRIEF DESCRIPTION OF THE DRAWINGS

FIG. 1 is a plan view of a conventional roll gap sled showing schematically the location of apparatus of this invention included therein.

FIG. 2 is a side elevation view of the apparatus taken on line II—II of FIG. 1.

DESCRIPTION OF THE PREFERRED EMBODIMENT

Referring to FIGS. 1 and 2 a conventional roll gap sled is shown for transport through the cooling zone in a continuous casting machine. Details of the conventional sled 10 are described in U.S. Pat. No. Re. 30,075 the specification of which is incorporated herein. The location of the apparatus in such a sled is illustrated at 11. This invention is not limited to application in this particular sled but may be used in others having certain characteristics hereinafter described.

Figure 4:
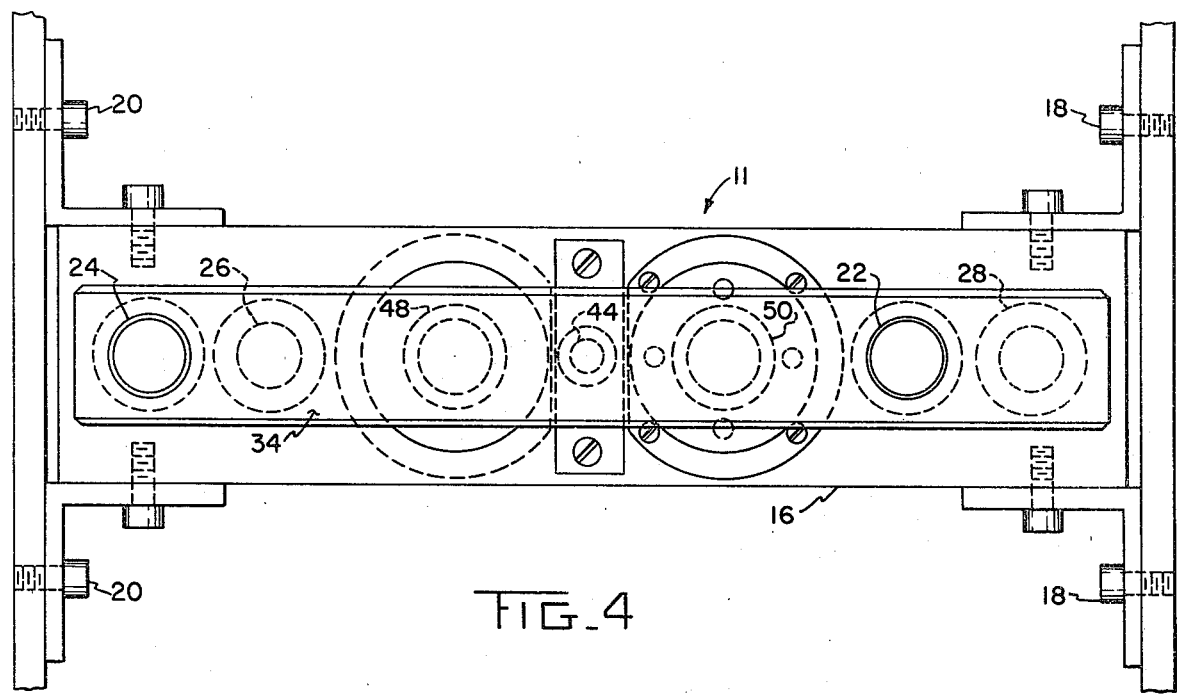
FIG. 4 is an enlarged plan view taken on line IV—IV of FIG. 3 of the apparatus of this invention.
Figure 3:
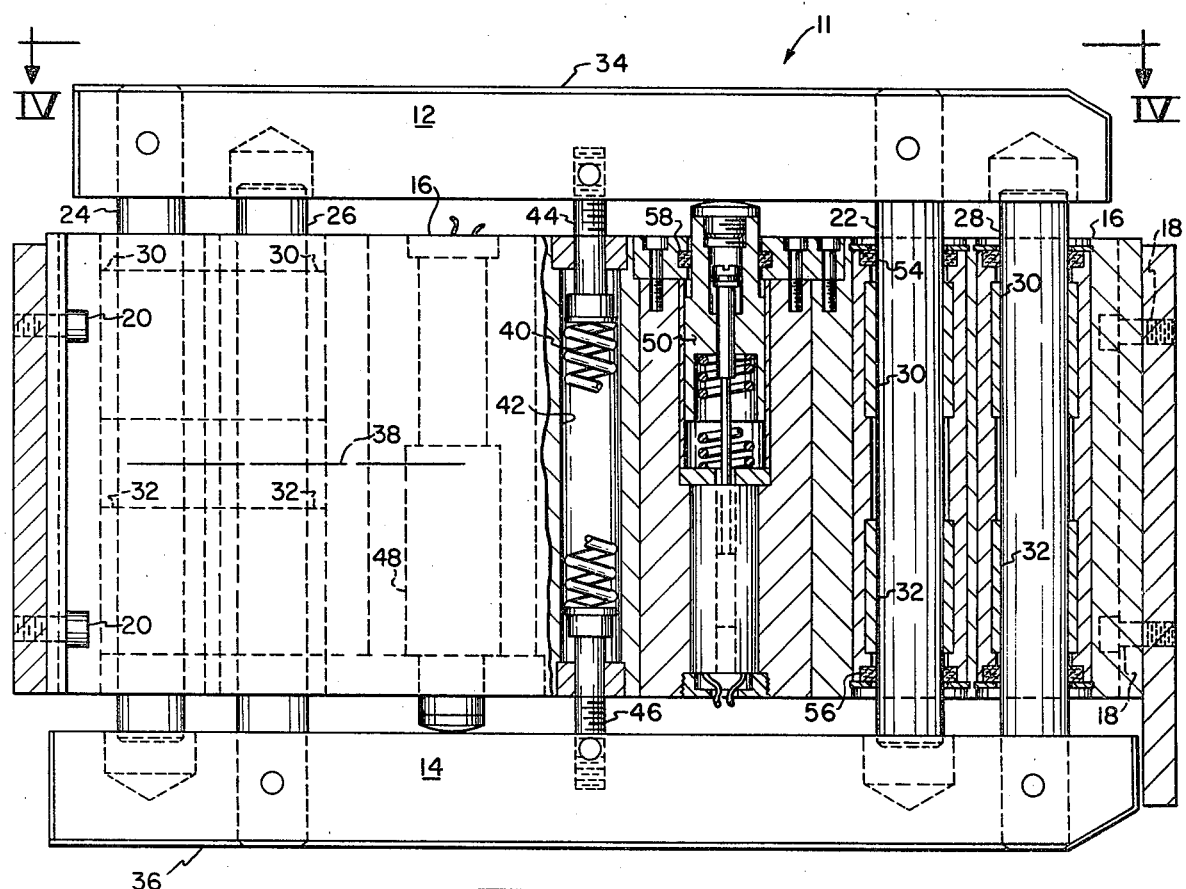
FIG. 3 is an enlarged section taken at III—III of FIG. 1 showing the apparatus of this invention.

Referring now to FIGS. 3 and 4, elongated measuring runners 12, 14 are shown mounted in housing 16 which is bolted at 18, 20 to the conventional sled. Posts 22, 24 attached adjacent opposite ends of runner 12, and posts 26, 28 similarly provided for runner 14, are each mounted in a pair of sleeve bushings 30, 32 of very close tolerance. Thus, the runners may be displaced by roll contact on outer longitudinal faces 34, 36 respectively but will remain parallel to housing axis 38 since substantially no lateral movement or tilt of the posts is permitted. An alternative mounting for the measuring runners to maintain their parallel alignment might be pivotable parallel posts similar to those shown in FIG. 11 of West German Offenlegungschrift No. 2,645,022. Compression spring 40 mounted in channel 42 between cap screws 44, 46 serves to urge the runners outward for abutting the rolls. Probes 48, 50 are provided for measuring the displacement of each runner from a reference point for example housing axis 38. The probes may be of conventional type providing an electrical output signal proportional to probe displacement, such as Model 7306 made by Pickering Company. However, any similar displacement transducer will be suitable.

Seals 54, 56 are provided at each end of the posts to prevent water or dirt from entering the housing. A seal 58 serves the same purpose for each transducer. Reference is specifically made to fixed runners of the conventional sled which abut the workfaces of bottom rolls of the roll rack in curved casting machines to guide the housing in a single transport path. This is accomplished by the lengthwise span of the fixed runners 60, 62 (FIG. 1) abutting two adjacent rolls but not more than two (for curved machines). Displaceable guide runners 64, 66 abut the top rolls spanning only two of them (in curved machines). These guide runners span sufficient additional length of the sapcing between the next adjacent rolls so that a fixed transport path is maintained for a substantial portion of the periphery of the rolls so that a reasonable measure of the eccentricity can be obtained. Preferably, these runners span an additional length of at least ½ of the roll circumference if sufficient spacing between rolls is available therefor.

It will be apparent that other means besides the fixed and displaceable guide-runners may be provided for (a) rotating the rolls by pressure contact, and (b) maintaining a fixed transport path. For example, the guiding function may be accomplished by a separate guide track spaced outward of each end of the rolls. The housing may have wheels which follow these tracks to assure constant reference alignment. Such an arrangement is shown in West German Auslegeschrift No. 2,253,794.

I claim:

1. An apparatus for measuring the eccentricity of a circumferential face of an axially rotatable roll, said apparatus comprising:
   a housing adapted for transport substantially tangent to the roll face in a direction normal to the roll axis,
   said housing including means (a) for guiding said housing during transport so that an axis thereof is maintained coincident with the transport direction and said transport direction is maintained constant at least for sufficient of the portion of said transport for determining eccentricity of the roll, and (b) for contacting said roll and causing rotation thereof at a circumferential speed equal to the rate of housing transport,
   an elongated measuring runner projecting laterally from said housing so as to be abutted and traversed by said roll along an outer longitudinal surface thereof, said longitudinal surface being parallel to the direction of housing transport and of length sufficient for measurement of eccentricity of said roll,
   means for mounting said measuring runner displaceably in the housing and maintaining said runner parallel to the housing axis in the transport direction, and
   means for measuring the displacement distance of said measuring runner from a reference position in the housing.

2. The apparatus of claim 1 wherein said measuring runner is located in a housing position so as to pass over a central portion of the face of said roll intermediate opposite ends thereof.

3. The apparatus of claim 1 wherein said outer longitudinal surface of the measuring runner is of length equal to at least one-half of the circumference of the face of said roll.

4. The apparatus of claim 1 wherein said measuring means includes a probe supported in the housing and displaceable by said measuring runner, said probe providing an output signal of magnitude proportional to displacement of said runner from the reference position in said housing.

5. The apparatus of claim 1 wherein said housing is adapted for measurement of the eccentricity of a plurality of rolls arranged in tandem, and wherein the means included in said housing for (a) guiding thereof and (b) rotating said rolls comprises at least two elongated guide runners fixed in position projecting from the housing for pressure contact with said rolls and extending longitudinally so as to span, at least two of adjacent ones thereof plus sufficient additional length, for measurement of the eccentricity of said rolls, said runners being spaced apart so as to abut said rolls proximate opposite ends of said face thereof to be measured.

6. An apparatus for measuring the eccentricity of conveying rollers in the secondary cooling zone of continuous casting machines, said apparatus comprising:
   a housing adapted for transport through said cooling zone between the rolls therein,
   said housing having means (a) for guiding the transport thereof, maintaining a housing axis coincident with the transport direction, and maintaining the transport direction constant for a sufficient portion of the transport adjacent each roll face for measurement of the eccentricity thereof, and (b) for contacting each roll so as to cause rotation thereof at a circumferential speed equal to the rate of housing transport,
   at least one elongated measuring runner projecting from each of opposite sides of the housing facing opposite of corresponding rolls in said cooling zone, an outer longitudinal surface of each runner being abutted and traversed lengthwise during transport by the face of each roll adjacent thereto, the outer longitudinal surface of each runner being of length for contact with a sufficient portion of the periphery of each roll for accomplishing a measure of the eccentricity thereof,
   means for mounting each measuring runner displaceably in said housing, and for maintaining said runners parallel to the housing axis in the transport direction, and
   means for measuring the displacement distance of each measuring runner from a reference position in the housing.

7. The apparatus of claim 6 wherein the means for guiding transport of the housing and rotating the rolls comprises at least two elongated guide runners projecting laterally a fixed distance from one side of the housing at spaced positions proximate opposite ends of said rolls, an outer longitudinal surface of each fixed runner to be abutted and traversed lengthwise during transport of the housing by said rolls, the length of the longitudinal surface of each runner spanning at least two adjacent rolls in the cooling zone plus sufficient additional distance for accomplishing a measure of eccentricity of the rolls and at least two elongated displaceable guide runners projecting laterally from an opposite side of the housing at spaced positions proximate opposite ends of said rolls, an outer longitudinal surface of each displaceable runner to be abutted and traversed lengthwise during transport of the housing by opposite rolls in the cooling zone from those contacted by the fixed runners, said displaceable runners being of substantially the same length as said fixed runners, and means for urging said displaceable runners outward to maintain sufficient pressure contact against the rolls to cause rotation thereof at a speed equal to the rate of housing transport.

8. The apparatus of claim 6 wherein said measuring runners are located centrally in said housing with respect to opposite ends of the rolls in the cooling zone.

9. The apparatus of claim 6 wherein said measuring runners and guide runners are of sufficient length for accomplishing a measure of eccentricity of at least one-half of the circumference of each of said rolls.

10. The apparatus of claim 6 wherein the measuring means includes a probe for each measuring runner mounted in the housing so as to be displaceable by said measuring runner, each said probe providing an output signal of magnitude proportional to displacement of said runner from the reference position in the housing.

* * * * *

UNITED STATES PATENT AND TRADEMARK OFFICE
CERTIFICATE OF CORRECTION

PATENT NO. : 4,363,172
DATED : December 14, 1982
INVENTOR(S) : Kenneth D. Ives

It is certified that error appears in the above—identified patent and that said Letters Patent is hereby corrected as shown below:

Column 1, line 46, after "port" insert -- and --

Column 2, line 69, "sapcing" should be -- spacing --

Signed and Sealed this

Twenty-second Day of March 1983

[SEAL]

Attest:

GERALD J. MOSSINGHOFF

Attesting Officer     Commissioner of Patents and Trademarks